US008655968B2

(12) United States Patent
St. Jacques, Jr.

(10) Patent No.: US 8,655,968 B2
(45) Date of Patent: Feb. 18, 2014

(54) METHOD AND APPARATUS FOR USING GAME MECHANICS TO ENCOURAGE SMARTER REPOSITORY USE BY EMAIL USERS

(75) Inventor: Robert J. St. Jacques, Jr., Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 135 days.

(21) Appl. No.: 13/311,845

(22) Filed: Dec. 6, 2011

(65) Prior Publication Data

US 2013/0144958 A1    Jun. 6, 2013

(51) Int. Cl.
*G06F 15/16* (2006.01)
(52) U.S. Cl.
USPC ........... 709/206; 709/224; 709/207; 709/225; 709/211; 709/210; 725/112; 725/136; 725/107; 725/9; 726/22; 726/23; 726/25; 707/609; 707/610; 707/611; 707/619; 707/620

(58) Field of Classification Search
USPC .......................................... 709/206, 208, 218
See application file for complete search history.

(56) References Cited

U.S. PATENT DOCUMENTS

| | | | |
|---|---|---|---|
| 7,783,597 B2 * | 8/2010 | Kirsch | 707/609 |
| 7,861,259 B2 * | 12/2010 | Barone, Jr. | 725/32 |
| 7,893,830 B2 * | 2/2011 | Anand et al. | 340/541 |
| 8,219,535 B1 * | 7/2012 | Kobori et al. | 707/694 |
| 8,316,233 B2 * | 11/2012 | Errico | 713/165 |
| 2003/0051253 A1 * | 3/2003 | Barone, Jr. | 725/112 |
| 2008/0120411 A1 * | 5/2008 | Eberle | 709/225 |
| 2010/0077041 A1 * | 3/2010 | Cowan et al. | 709/206 |
| 2010/0169970 A1 * | 7/2010 | Stolfo et al. | 726/22 |

* cited by examiner

*Primary Examiner* — Jude Jean Gilles

(57) ABSTRACT

A method, non-transitory computer readable medium, and apparatus for processing an email are disclosed. For example, the method receives a statistic associated with the email, calculates a score for the email based upon the statistic, updates an overall score of a sender of the email based upon the score that is calculated, and presents the overall score that is updated to a display device of the sender.

20 Claims, 4 Drawing Sheets

US 8,655,968 B2

METHOD AND APPARATUS FOR USING GAME MECHANICS TO ENCOURAGE SMARTER REPOSITORY USE BY EMAIL USERS

The present disclosure relates generally to modifying a user's email practice and, more particularly, to a method and apparatus for using game mechanics to encourage smarter repository use by email users.

BACKGROUND

Many email users practice bad habits that potentially create many problems. One example of a bad habit that email users practice is sending many documents and/or large documents as attachments to their email messages. However, the size of the attachments will affect network resources as the attachments are copied for each recipient to which the email is sent. As a result, bandwidth and storage space is consumed even for recipients who never read the attachments.

In addition, the attachments may quickly exceed the quota for users who have a limit as to their email use, e.g., a fixed size as to an input email folder. As a result, the users with full quotas may be unable to send or receive emails. Finally, sending attachments in an email to solicit feedback and/or edit documents also makes it likely that many different versions of the same document may be in circulation simultaneously.

SUMMARY

According to aspects illustrated herein, there are provided a method, a non-transitory computer readable medium, and an apparatus for processing an email. One disclosed feature of the embodiments is a method that receives a statistic associated with the email, calculates a score for the email based upon the statistic, updates an overall score of a sender of the email based upon the score that is calculated, and presents the overall score that is updated to a display device of the sender.

Another disclosed feature of the embodiments is a non-transitory computer-readable medium having stored thereon a plurality of instructions, the plurality of instructions including instructions which, when executed by a processor, cause the processor to perform a method that receives a statistic associated with the email, calculates a score for the email based upon the statistic, updates an overall score of a sender of the email based upon the score that is calculated, and presents the overall score that is updated to a display device of the sender.

Another disclosed feature of the embodiments is an apparatus comprising a processor that is configured to receive a statistic associated with the email, to calculate a score for the email based upon the statistic, to update an overall score of a sender of the email based upon the score that is calculated, and to present the overall score that is updated to a display device of the sender.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for applying game mechanics to email usage. As discussed above, many email users practice bad habits that potentially create many problems.

Thus, it would be advantageous to apply game mechanics to email usage to modify the behavior of email users. For example, a point or score system may be established that penalizes the use of attachments and rewards the use of links to documents that are stored in trusted repositories. A user's desire to "win" the game and peer pressure from other users viewing the published scores of the email users would result in a lower use of attachments and a greater use of the trusted repositories. As a result, email storage space, network resources and bandwidth would be used more efficiently.

Figure 1:
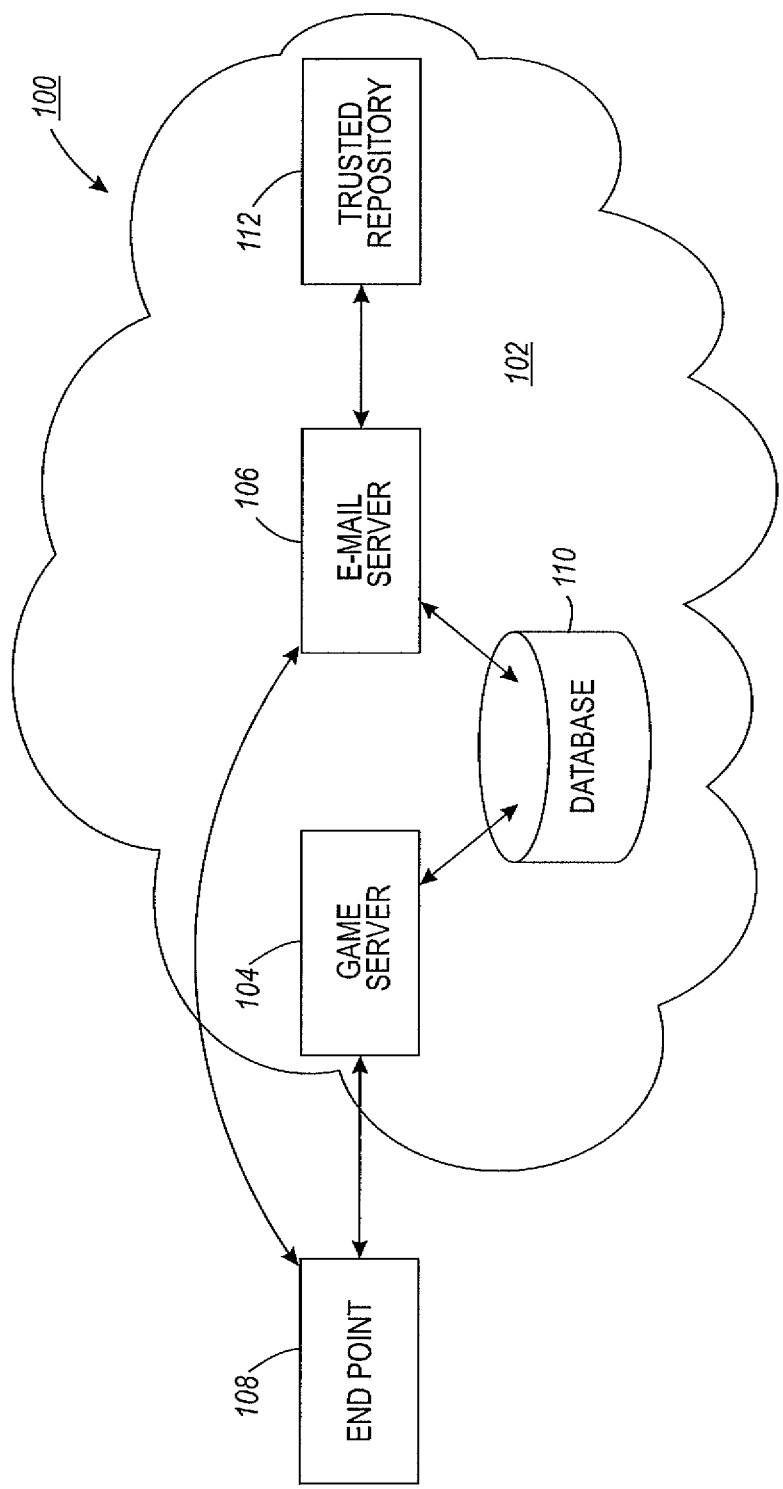
FIG. 1 illustrates one example of a communication network of the present disclosure.

To better understand the present disclosure, FIG. 1 illustrates an example of a communication network 100. In one embodiment, the communication network 100 includes an Internet Protocol (IP) network 102. The IP network 102 may be, for example, the Internet, a service provider network, an access network, a core network, and the like.

In one embodiment, the IP network 102 may include a game server 104, an email server 106, a database (DB) 110 and a trusted repository 112. Although the game server 104, the email server 106, the database 110 and the trusted repository 112 are illustrated as separate hardware components in the IP network 102, it should be noted that functions of the game server 104, the email server 106, the database 110 and the trusted repository 112 may be incorporated into a single piece of hardware, such as a general application server in the IP network 102. In addition, although the game server 104, the email server 106, the database 110 and the trusted repository 112 are illustrated as being co-located in the same IP network 102, it should be noted that the game server 104, the email server 106, the database 110 and the trusted repository 112 may be placed in different locations in one or more different IP networks 102.

In one embodiment, the game server 104 calculates and tracks scores for every player. Administrators can configure the game server 104 to include the hostname or IP address of trusted content repositories, e.g., the trusted repository 112. The game server 104 may also keep track of a leader board of all of the players. The game server 104 may also track various badges and achievements obtained by each of the players.

In one embodiment, the email server 106 is a standard email server. The database 110 may store records of all of the players involved, profiles of the players involved, game records and the like. The database 110 may serve as an optional storage device for storing data of the game server 104 and the email server 106.

In one embodiment, the trusted repository 112 may be a centralized content repository, e.g., hosted by one or more servers or storage systems. For example, the trusted repository 112 may serve as a document management system. As a result, the trusted repository 112 may store all content such as for example, pictures, documents, spreadsheets and other various files. The users may then access the documents from the trusted repository 112. Using the trusted repository 112 allows users to simply provide links (e.g., pointers) to the documents that are stored in the trusted repository 112 and minimizes the need to enclose the actual attachments in the emails.

Directing email recipients to the trusted repository 112 also provides a business advantage for the business enterprise that operates the trusted repository 112. For example, the business enterprise may collect and track data and usage statistics about the users and the documents that are accessed. This information may be valuable to the business enterprise.

In one embodiment, one or more endpoint devices 108 may be in communication with the IP network 102. In one embodiment, the endpoint device 108 may be any device capable of sending and receiving an email, such as for example, a personal computer, a lap top computer, a tablet device, a smartphone, a cellular phone, a netbook, and the like. Although only a single endpoint device 108 is illustrated in FIG. 1, it should be noted that any number of endpoint devices may be deployed.

The one or more endpoint devices 108 may be associated with a user or sender of an email. The user or sender may also be referred to as the player of the "email game."

In one embodiment, the endpoint device 108 may include and execute an email client that is embedded or modified with an "email game" functionality. In one embodiment, the "email game" functionality may be an add-in for an existing email client, such as for example, Microsoft® Outlook®. The endpoint device 108 may send and receive emails via the email server 106. The endpoint device 108 executing the email client may send or receive game information to and from the game server 104 on a regular basis, e.g., each time the inbox is updated, each time a message is sent, once an hour, once a day, etc.

In one embodiment, the email client on the endpoint device 108 may collect statistics about each email that is about to be sent by the endpoint device 108. In one embodiment, the collected statistics may be sent to the game server 104 to calculate a score for the email. The statistics may include, for example, a number of attachments, a size of each of the attachments, a number of links to trusted repositories and the number of recipients. Exemplary details about how the statistics may affect scoring and how the scores may be calculated are discussed in further detail below with reference to FIG. 3.

It should be noted that the network 100 has been simplified for clarity. For example, the network 100 may include other network elements such as border elements, routers, switches, policy servers, security devices, firewalls, a content distribution network (CDN) and the like. In addition, the network 100 may include additional networks between the endpoint 108 and the IP network 102 such as different access networks (e.g., a wired access network, a cable network, a wireless network, a cellular network, a Wi-Fi network, and the like) to reach the IP network 102.

Figure 2:
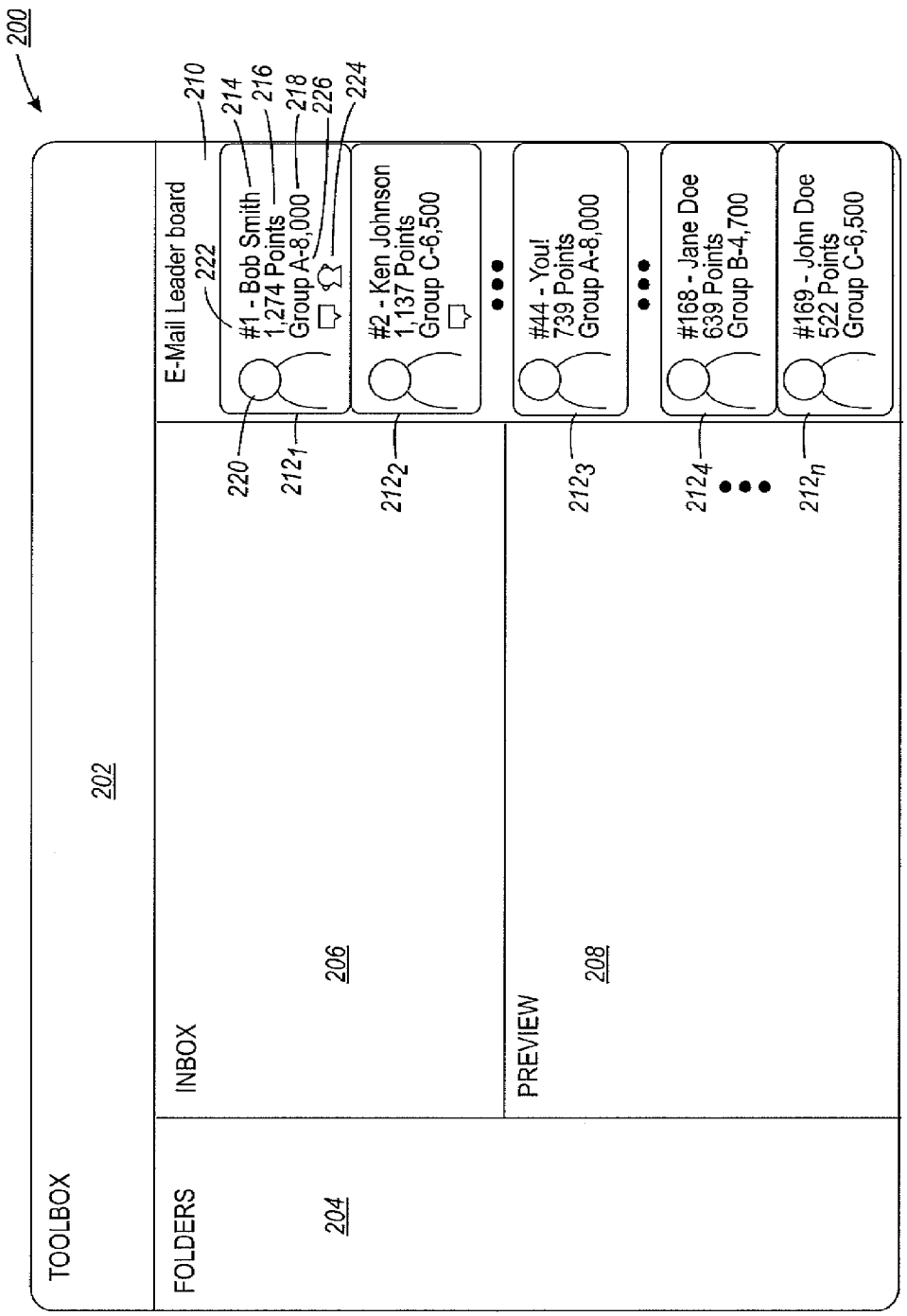
FIG. 2 illustrates an example graphical user interface of an email client of the present disclosure.

FIG. 2 illustrates one example of a graphical user interface (GUI) 200 of the email client that is embedded with the "email game" functionality. The GUI 200 includes sections, such as for example, a toolbar section 202, a folders section 204, an inbox section 206 and a preview pane 208.

In addition, the email client modified with the "email game" functionality may add a leader board section 210. In one embodiment, the leader board section 210 may include one or more score icons $212_1$ to $212_n$ (hereinafter also referred to collectively as "score icons 212"). Each one of the score icons 212 may include a player name 214, a total point score 216, a group name 226, a group score 218, an avatar 220, a ranking 222 and one or more badges 224.

In one embodiment, the leader board section 210 may list the top few players (e.g., the top ten players), the player using the GUI 200 (e.g., the score icon $212_3$) and the last few players (e.g., the bottom five players). As a result, a player may visually see where he or she is ranked in the game relative to other players.

In one embodiment, the leader board section 210 may be sorted by various parameters. For example, the player may sort the leader board section 210 by name, by group score 218, by group name 226, and the like. In another embodiment, the leader board section 210 may also include rankings of the groups by the group score 218. For example, the group score 218 may include a total score of all members within a particular group. For example, the players may be associated into groups by department (engineering department, legal department, purchasing department, human resource department, shipping department, billing department, and so on), floor, job function, by friends and the like.

As a result, the players may compete between groups as well as at an individual level. The groups provide additional peer pressure to help modify behavior of an email user if they are underperforming and dragging down a score of an entire group.

In one embodiment, the total point score 216 may be a rolling score based over a predefined period of time. For example, to keep the game "fresh" for all players, the total point score 216 may be kept for a rolling seven day period. In another embodiment, the total point score 216 may be reset to zero for all players on every Monday or every month.

In one embodiment, the avatar 220 may be an image that represents the player. The avatar 220 may be personalized or customizable by the player. For example, a player may choose a picture of himself or a computer generated icon or graphics as his avatar 220.

In one embodiment, badges 224 may be awarded for specific achievements. For example, a badge 224 may be awarded to a player for going a month without sending an attachment, sending 10 messages with links to trusted content repositories in one week, and the like. The badges 224 may be used to publicly display a player's specific achievements.

Although an example of an arrangement of the GUI 200 is illustrated in FIG. 2, it should be noted that there are many possible arrangements for the different sections of the GUI 200. In addition, the GUI 200 may include additional sections not shown or fewer sections than illustrated in FIG. 2.

Figure 3:
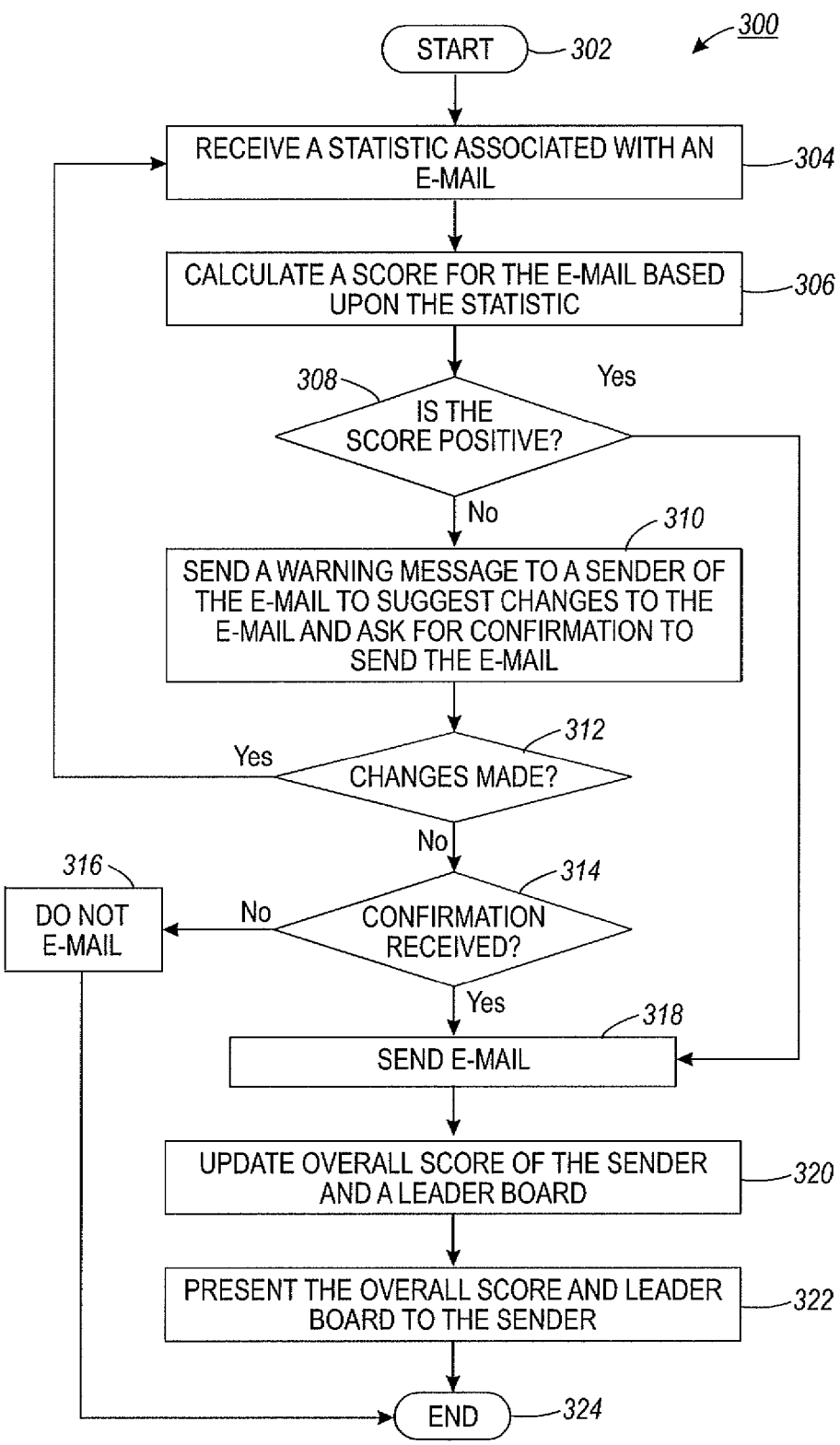
FIG. 3 illustrates an example flowchart of one embodiment of a method for applying game mechanics to email usage to encourage smarter repository use.
Figure 4:
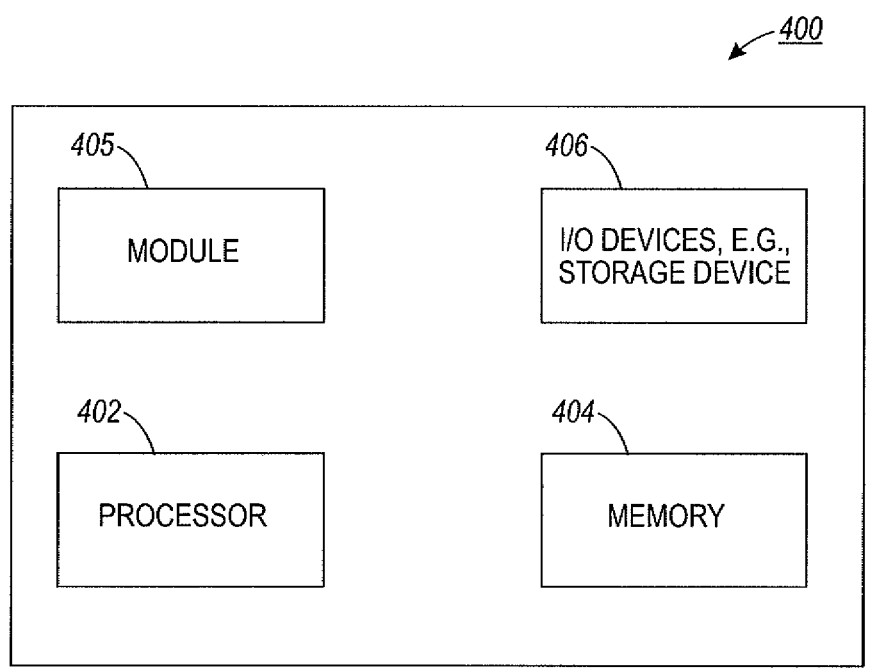
FIG. 4 illustrates a high-level block diagram of a general-purpose computer suitable for use in performing the functions described herein.

FIG. 3 illustrates a flowchart of a method 300 for applying game mechanics to email usage. In one embodiment, the method 300 may be performed by the game server 104 or a general purpose computer as illustrated in FIG. 4 and discussed below.

The method 300 begins at step 302. At step 304, the method 300 receives a statistic associated with an email. For example, when a user of the endpoint device 108 creates an email via the email client running on the endpoint device 108, the email client may collect statistics associated with the email. The statistics may include, for example, a number of attachments, a size of each attachment, a number of links to one or more trusted repositories and a number of recipients.

In one embodiment, the statistics may be collected after the user hits a send button, but before the email is actually sent. For example, the email may be held until the score is calculated for the email and confirmation is received that the user would like to send the email based upon the calculated score. In another embodiment, the statistics may be received continuously. For example, the email may be monitored as it is being drafted and each time a document is attached or a link is created in the email, the statistics may be received by the game server 104.

At step 306, the method 300 calculates a score for the email based upon the statistics. A variety of methods and scoring systems may be used to calculate a score using the statistics. However, in one embodiment, a positive score may be attributed for each one of the number of links. For example, each link may be worth 10 points.

In one embodiment, a negative score may be attributed to each one of the number of attachments relative to a respective size of each one of the number of attachments. For example, every 100 kilobyte (kb) of an attachment may be worth −1 point. Thus, if an attachment is 1,785 kb then the score for the attachment would be −17.85 points. In one embodiment, the score may be rounded for ease of computation, e.g., −17.85 points may be rounded up to −20 points.

In one embodiment, the number of recipients may be a multiplying factor. For example, if an email includes 20 recipients with three links and two attachments having a size of 2,000 kb and 1300 kb, respectively. Using the above point scale, the score may be calculated as (3 (links)*10(points per link))*20 (recipients)+((2,000 (kb)/100)*(−1 (points per 100 kb))*20 (recipients)+(1300 (kb)/100)*(−1 (points per 100 kb)*20 (recipients))=−60 points. Thus, in the above scenario, the user would potentially receive −60 points for sending the email having three links and two attachments having a size of 2,000 kb and 1300 kb, respectively, to 20 recipients.

It should be noted that although an example point scale is used to illustrate how a score may be calculated, that any type of point scale may be used to calculate the score of the email. For example, in another embodiment ratio scoring may also be used. A score may be calculated based upon a number of emails with links divided by a total number of emails or a number of emails with links versus a number of emails with attachments and so on.

In addition to calculating the score for the email, the game server 104 may determine if any additional achievements or badges should be awarded for the email. For example, if the player has gone a month without sending an attachment or sending ten messages with links to trusted content repositories in one week. The badges may be displayed in the player's score icon.

At step 308, the method 300 determines if the score is positive. If the score is positive, the method 300 may proceed to step 318, where the email is sent. However, if the score is not positive, the method 300 may proceed to step 310.

At step 310, the method 300 sends a warning message to a sender of the email to suggest possible changes to the email and requests for a confirmation to send the email if no changes are made. For example, the warning message may suggest to the sender (e.g., the player of the "email game") to replace attached content with a link to the content located in a trusted repository. The warning message may include the links to the content (e.g., a document) or the IP address of the trusted content repository that contains the content the sender is trying to attach to his or her email.

In addition, the warning message may indicate the current score of the email and what the potential new score may be if the changes are made in accordance with the suggestions. For example, the warning message may indicate that the sender would receive −100 points for the current email; however, if the attachments are replaced by a link, the sender would receive 10 points for the same email message. In addition, the warning message may request a confirmation from the sender to send the email even though the sender would receive a negative score for the email.

At step 312, the method 300 checks to see if any changes were made to the email. If any changes were made, the method 300 may return to step 304 to receive a statistic associated with the email that is changed (e.g., the new modified email) such that the score of the email may be recalculated at step 306.

However, if at step 312 no changes are detected, the method 300 may proceed to step 314. At step 314, the method 300 determines if a confirmation was received to send the email, even though the sender will receive a negative score for the email.

If no confirmation is received at step 314, the method 300 proceeds to step 316. At step 316, the method does not send the email. The method 300 then proceeds to step 324, where the method 300 ends.

Referring back to step 314, if at step 314 a confirmation is received, then the method 300 may proceed to step 318. At step 318, the method 300 sends the email.

At step 320, the method 300 updates an overall score of the sender and a leader board. For example, the score for the sent email may be applied to the sender's previous overall score to calculate the current overall score. To illustrate, if the score for the sent email was 50 points and the sender's previous overall score was 1200 points, then the overall score would now be 1250 points. Based upon the updated overall score, the method 300 may also update the leader board and adjust the rankings of the players and group scores, if applicable.

At step 322, the method 300 presents the overall score and the leader board to a display device (e.g., a monitor, a display screen of a device capable of sending/receiving emails) of the sender to influence the behavior of the sender with respect to using repositories in the email. As illustrated in FIG. 2, the GUI 200 may illustrate the leader board and the score icon of the sender with the sender's overall score relative to other players.

Publishing the leader board to the players provides incentive and peer pressure to help improve the players' habits with respect to email usage. For example, if a sender realizes that he is in 150$^{th}$ place out of 170, he may feel pressured to improve his email habits by including more links rather than using attachments. In addition, by using groups, the sender may be further pressured by other group members if he is the main cause for bringing the overall group score down. As a result, applying game mechanics to email usage helps to improve email usage behavior such as, for example, using links to trusted content repositories instead of actual attachments in emails. The method ends at step 324.

It should be noted that although not explicitly specified, one or more steps of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for applying game mechanics to email usage, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for applying game mechanics to email usage can be loaded into memory 404 and executed by processor 402 to implement the functions as discussed above. As such, the present methods 405 for applying game mechanics to email usage (including associated data structures) of the present disclosure can be stored on a non-transitory computer readable storage medium, e.g., RAM memory, magnetic or optical drive or diskette and the like. For example, the hardware processor 402 can be programmed or configured with instructions (e.g., computer readable instructions) to perform the steps of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for processing an email, comprising:
receiving a statistic associated with the email;
calculating a score for the email based upon the statistic after a sender hits a send button, but before the email is actually sent;
sending a warning message to the sender when the score is negative, wherein the warning message includes one or more suggestions on how to modify the email to obtain a positive score;
updating an overall score of the sender of the email based upon the score that is calculated when the score is positive; and
presenting the overall score that is updated to a display device of the sender.

2. The method of claim 1, wherein the statistic comprises at least one of: a number of attachments, a size of each attachment, a number of links to one or more trusted repositories, or a number of recipients.

3. The method of claim 2, wherein the number of attachments affects the score negatively.

4. The method of claim 2, wherein the number of links to one or more trusted repositories affects the score positively.

5. The method of claim 1, wherein the one or more suggestions comprise a suggestion to replace an attachment with a link to a trusted repository.

6. The method of claim 1, wherein the warning message includes a new score based upon if the email is modified in accordance with the one or more suggestions.

7. The method of claim 6, further comprising:
updating the overall score of the sender with the new score if the email is modified in accordance with the one or more suggestions.

8. The method of claim 1, further comprising:
updating a leader board with the overall score that is updated, wherein the leader board comprises a plurality of senders of email, wherein each one of the plurality of senders of email has a respective overall score.

9. The method of claim 8, wherein the overall score and the leader board are based upon a rolling score over a predefined period of time.

10. A non-transitory computer-readable medium having stored thereon a plurality of instructions, the plurality of instructions including instructions which, when executed by a processor, cause the processor to perform a method for processing an email, comprising:
receiving a statistic associated with the email;
calculating a score for the email based upon the statistic after a sender hits a send button, but before the email is actually sent;
sending a warning message to the sender when the score is negative, wherein the warning message includes one or more suggestions on how to modify the email to obtain a positive score;
updating an overall score of the sender of the email based upon the score that is calculated when the score is positive; and
presenting the overall score that is updated to a display device of the sender.

11. The non-transitory computer-readable medium of claim 10, wherein the statistic comprises at least one of: a number of attachments, a size of each attachment, a number of links to one or more trusted repositories, or a number of recipients.

12. The non-transitory computer-readable medium of claim 11, wherein the number of attachments affects the score negatively.

13. The non-transitory computer-readable medium of claim 11, wherein the number of links to one or more trusted repositories affects the score positively.

14. The non-transitory computer-readable medium of claim 10, wherein the one or more suggestions comprise a suggestion to replace an attachment with a link to a trusted repository.

15. The non-transitory computer-readable medium of claim 10, wherein the warning message includes a new score based upon if the email is modified in accordance with the one or more suggestions.

16. The non-transitory computer-readable medium of claim 10, further comprising:
updating a leader board with the overall score that is updated, wherein the leader board comprises a plurality of senders of email, wherein each one of the plurality of senders of email has a respective overall score.

17. The non-transitory computer-readable medium of claim 16, wherein the overall score and the leader board are based upon a rolling score over a predefined period of time.

18. A method for processing an email, comprising:
receiving statistics associated with the email, wherein the statistics include one or more of: a number of attachments, a number of links to one or more trusted repositories, and a number of recipients;
calculating a score for the email based upon one or more of the number of attachments, the number of links and the number of recipients, wherein a positive value is attributed for each one of the number of links and a negative value is attributed for each one of the number of attachments, and the number of recipients is used as a multiplying factor;

sending a warning message to a sender of the email, if the score for the email is negative, wherein the warning message includes one or more suggestions on how to modify the email to obtain a positive score, if the score is positive, updating an overall score of the sender of the email with the score that is calculated, and updating a leader board having a plurality of senders of email, wherein each one of the plurality of senders of email has a respective overall score, wherein the overall score and the leader board are based upon a rolling average of scores over a predefined period of time; and presenting the overall score and the leader board to a display device of the sender.

19. The method of claim 18, wherein the one or more suggestions comprise a suggestion to replace an attachment with a link to a trusted repository.

20. The method of claim 18, wherein the warning message includes a new score based upon if the email is modified in accordance with the one or more suggestions.

\* \* \* \* \*